Sept. 24, 1963
J. C. NASH
3,104,444
TENTER CLIP GATE
Filed Dec. 12, 1961
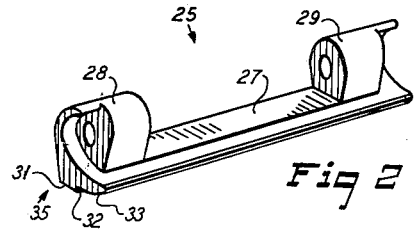
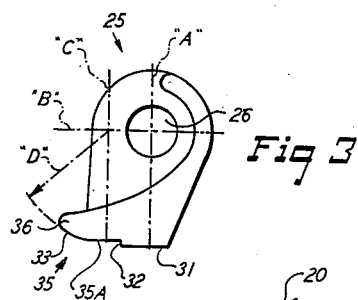
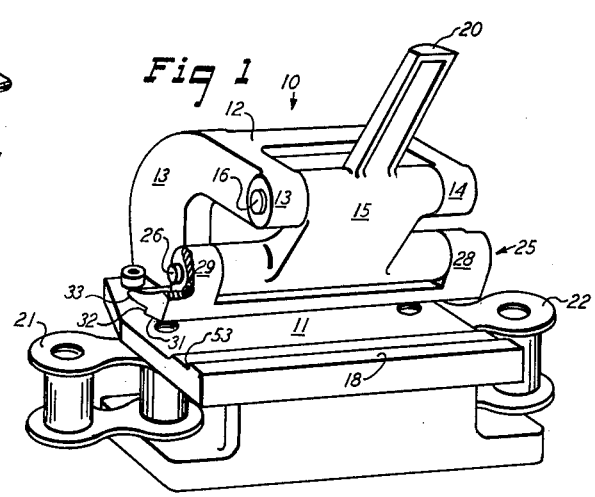
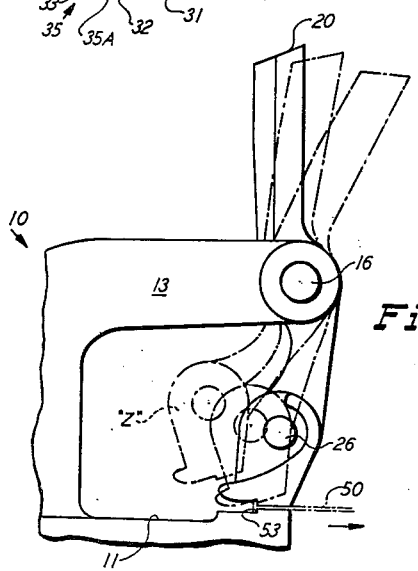
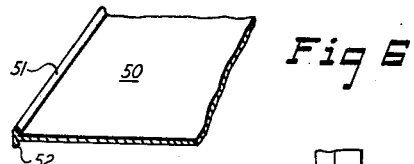
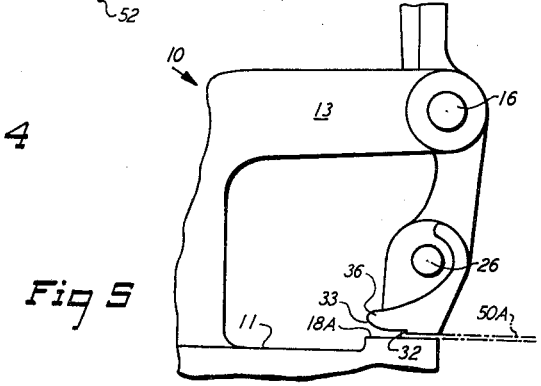
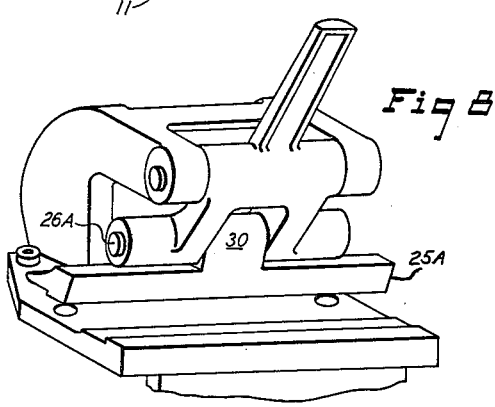
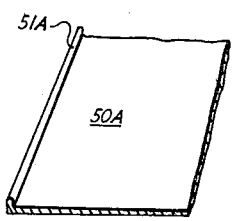
INVENTOR.
JOHN CRANDON NASH
BY
William Frederick Werner.
ATTORNEY

United States Patent Office 3,104,444
Patented Sept. 24, 1963

3,104,444
TENTER CLIP GATE
John Crandon Nash, 25 Rhode Island Ave.,
Providence 6, R.I.
Filed Dec. 12, 1961, Ser. No. 158,807
6 Claims. (Cl. 26—62)

This invention relates to tenter clip gates and more particularly to the edge of the gate and the type of gripping action performed by the tenter clip gate.

One of the objects of the present invention is to provide a tenter clip gate edge with a novel shape and a blocking type pinching web holding action.

Another object of the present invention is to provide a tenter clip gate with a true toggle joint action and to weight the gate on the rear end.

Still another object of the present invention is to provide means for positively actuating a toggle joint tenter clip gate into web holding position.

Still another object of the present invention is to provide a tenter clip gate with an edge which will positively yet tenderly grip extremely thin plastic sheeting between gate edge and clamping plate and lock a beaded edge of the plastic sheeting in tenter clip holding position.

A further object of the present invention is to provide a tenter clip gate with an edge which will tenderly yet firmly grip extremely thin plastic sheeting between gate edge and clamping plate with an action which prevents tearing the delicate and slippery plastic sheeting.

Another object of the present invention is to provide a delicate squeezing type gripping action between a tenter clip gate and a clamping plate on thin, slippery, delicate, plastic material regardless of the speed of the tentering machine.

Still a further object of the present invention is to provide an increased clamping area between a tenter clip gate and a clamping plate as the material clamped therebetween exerts an increased pulling force in an effort to pull free of the clamping action.

Still a further object of the present invention is to provide mechanical means on the gate alone or on both the gate and clamping plate which cooperates with a bead on the edge of plastic film to increase the clamping or gripping action of the gate as the pull of the plastic film increases.

Other objects of the present invention will be pointed out in part and become apparent in part in the following specification and claims.

The present invention is a continuation-in-part of United States patent application Serial No. 823,886 filed June 30, 1959 for a Tenter Clip Gate by John Crandon Nash, the present applicant, and now United States Patent No. 3,023,479.

The problem of gripping slippery film has not been solved satisfactorily with prior tenter clips. It has therefore become necessary to place a single bead or a double bead on the edge of the film in a manner to co-act with the tenter clip in order to be able to tenter slippery film. The present invention is directed to the co-acting structure of the tenter clip with the bead on the edge of the web material.

In the specification and claims the term film includes any type of web material such as cotton, wool, synthetic fibers, plastic film, aluminum foil, glossy paper, etc.

Referring to the drawings in which similar characters of reference indicate corresponding parts in all the figures:

FIGURE 1 is a perspective view of a tenter clip embodying the new and improved tenter clip gate.

FIGURE 2 is a perspective view of the tenter clip gate.

FIGURE 3 is a right side elevational view of FIGURE 2.

FIGURE 4 is a fragmentary left side elevational view of FIGURE 1 showing the gate in film gripping position; the thickness of the film being exaggerated for clarity of illustration.

FIGURE 5 is a view similar to FIGURE 4 illustrating a modified form of clamping plate.

FIGURE 6 is a fragmentary perspective view of a web material provided with a double beaded edge.

FIGURE 7 is a fragmentary perspective view of a web material provided with single beaded edge.

FIGURE 8 is a perspective view of a modified form of tenter clip gate.

FIGURE 1 illustrates a tenter clip generally indicated by reference numeral 10, comprising a horizontally disposed base 11, a vertically upstanding bracket 12, a pair of arms 13, 14 which project sidewise from upstanding bracket 12 to overlie said horizontally disposed base 11, and a movable jaw 15. A pintle 16 is mounted in said pair of arms 13, 14. Jaw 15 is loosely hinged to pintle 16 to be normally free to move automatically into vertical relation with horizontally disposed base 11, under the action of gravity.

A clamping area or plate 18 is provided in horizontally disposed base 11, either integrally as shown in FIGURES 1 and 4 or as a separate member in accordance with the past custom in the art. Clamping plate 18 is used with web material having a double beaded edge illustrated in FIGURE 6.

FIGURE 5 illustrates a clamping area or plate 18A used with web material having a single beaded edge as illustrated in FIGURE 7.

Movable jaw 15 is provided with an operating leg 20 adapted to be actuated by a cam (not shown) which pivots jaw 15 into film release position.

Horizontally disposed base 11 is connected to and forms part of an endless chain of which links 21, 22 form a part. (See FIGURE 1.) Links 21, 22 are pivotally connected to horizontally disposed base 11 in a manner old in the art.

The present invention relates to a pivotally mounted swing foot or gate generally indicated by reference numeral 25 which is pivotally mounted to movable jaw 15 by means of a shaft 26. Gate 25 comprises a counterweighted body 27 having oppositely aligned bearings 28, 29 as illustrated in FIGURES 1 and 2 or a single bearing 30 as illustrated in FIGURE 8. Body 27 is provided with a film engaging face or horizontal surface 31 at the front or toe edge thereof.

Referring to FIGURE 3 wherein centerlines are illustrated to show the counterweight feature of pivotally mounted swing foot or gate 25 and the concomitant toggle action; vertical centerline "A" passes through the vertical center of shaft 26 and horizontal centerline "B" passes through the horizontal center of shaft 26. Vertical centerline "C" passes through vertical center of gravity of gate 25 and is always located toward the rear side of gate 25. A radius "D" with its center on the vertical center of gravity "C" is struck from a vertical step 32 rearwardly to create an arcuate surface 33 formed in the rearward area of a shoe face generally indicated by reference character 35. Vertical step 32 extends the full length of body 27. Radius "D" may be any radius struck along line "C" but preferably it is located upon horizontal centerline "B." Heel 36 is of sufficient size and weight to form a counterbalance in gate 25 so that as gate 25 pivots freely upon shaft 26 heel 36 will hang downwardly as in the dot and dash position "Z" in FIGURE 4. It will be noted that movable jaw 15 is freely pivoted upon pintle 16 and gate 25 is freely pivoted on shaft 26 to form a type of toggle joint action. A horizontal surface 35A may extend from vertical step 32 to intersect and be tangent to radius D and form a horizontal continuation of arcuate surface 33. The cam (not shown) engages operating leg 20 to move it from film gripping to open or film disengaging position. As the tenter chain moves around a sprocket (not shown) to film engaging position, gravity and the pull of the web or film causes the gate to grip the film between the gate and clamping plate. Gate 25 is counterweighted so that film engaging face 31 pivots, in a toggle action, into engagement with the film to be gripped. See FIGURE 4. The bead on the film engages vertical step 32 as the tenter chain moves in the tenter path of travel and tentering action. The tentering action causes the film to exert a pull or force in the direction of the arrow in FIGURE 4. This pull merely causes gate 25 to further pivot on shaft 26 thereby forcing film engaging face 31 into wedging contact with the clamping plate with the film therebetween. The vertical center of pintle 16 is always forward of the vertical center of shaft 26 so that the movable jaw 15 in forwardmost position has caused gate 25 to pivot on shaft 26 into film gripping position. There are two general types of tenter clips in use which in effect describe the system of tentering. In one system a controller is used. In the other system a controller is eliminated. The first mentioned system is desirable and is the system to which this present improved gate is directed.

FIGURE 6 illustrates a fragmentary section of one side of a two sided continuous web 50 of slippery pastic film with opposite sides having a double beaded edge. The double bead in one side is indicated as being upper edge 51 and lower edge 52. FIGURES 1 and 4 illustrate clamping plate 18 provided with a vertical wall or step 53 which cooperates with vertical step 32. Upper edge 51 abuts vertical step 32. Lower edge 52 abuts vertical step 53 and film engaging face 31 squeezes web 50 between face 31 and clamping plate 18. Thus the slippery plastic film 50 is securely held.

FIGURE 7 illustrates a fragmentary section of one side of a two sided continuous web 50A of slippery plastic film with opposite sides provided with a single beaded edge 51A.

FIGURE 5 illustrates clamping plate 18A as being horizontally smooth or level. Bead 51A abuts vertical step 32. Film engaging face 31 squeezes web 50A between face 31 and clamping plate 18A. The greater the pull exerted by web 50 the more gate 25 pivots on shaft 26 and the tighter film engaging face 31 will squeeze web 50A against clamping plate 18A.

FIGURE 8 illustrates gate 25A as having a single bearing 30 pivotally mounted upon shaft 26A. In other respects gate 25A and gate 25 are identical in construction.

Film engaging face 31 normally lies parallel to clamping plate 18 in film engaging position with bead 51A abutting vertical step 32.

A gap approximately equal to the thickness of web 50 (or 50A) exists between film engaging face 31 and clamping plate 18. This gap is measured in thousandths of an inch. Should the film 50 through the bead exert a greater than normal pulling force, gate 25 will pivot causing film engaging face to tilt and squeeze the film between the rear portion of film engaging face 31 and clamping plate 18. It is generally contemplated to provide gate 25 in sizes which allow a gap equal to or slightly less than the thickness of the film to exist between film engaging face 31 and clamping plate 18. In this manner the bead on the film co-acts with vertical step 32 to hold the film with the assistance of the clamping action of film engaging face 31 co-acting with clamping plate 18. In the past this clamping action was a wedging action initiated by a blade. Such wedging action tears delicate film before enough force can be exerted to hold the slippery film or web.

Having shown and described a preferred embodiment of the present invention, by way of example, it should be realized that structural changes could be made and other examples given without departing from either the spirit or scope of this invention.

What I claim is:

1. A tenter clip comprising a horizontally disposed base, a vertically upstanding bracket and a pair of arms which project sidewise from said bracket to overlie said base, a movable jaw, a pintle mounted in said pair of arms, said movable jaw loosely hinged to said pintle to be normally free to move automatically into vertical relation with said base under the action of gravity, a gate comprising a counterweighted body having a bearing, said body provided with a shoe face having a contour of a horizontal surface and a counterweighted area, a vertical step between said horizontal surface and said counterweighted area, a shaft in said movable jaw, said gate loosely hinged through sid bearing to said shaft and movable jaw, to be normally free under the influence of gravity to move automatically into position with said horizontal surface overlying said horizontally disposed base due to the counterweighting of said body, when said movable jaw is in vertical relation with the base, and with said vertical step overlying said horizontally disposed base.

2. A tenter clip comprising a horizontally disposed base, a vertically upstanding bracket and a pair of arms which project sidewise from said bracket to overlie said base, a movable jaw provided with an operating leg, a pintle mounted in said pair of arms, said movable jaw loosely hinged to said pintle to be normally free to move automatically into vertical relation with said base under the action of gravity, a gate comprising a counterweighted body having a bearing, said body provided with a shoe face having a contour of substantially a horizontal surface, an arcuate surface, and a vertical step between said horizontal surface and arcuate surface, a shaft in said movable jaw, said gate loosely hinged through said bearing to said shaft, said horizontal surface being generated as perpendicular to a vertical line passing through the center of the pivoted shaft connection between said gate and said movable jaw, said arcuate surface forming a continuation of said vertical step, said arcuate surface being generated on the vertical center line of gravity of said gate, said gate normally free under the influence of gravity to move automatically into position with said horizontal surface overlying said horizontally disposed base due to the counterweighting of said body, when said movable jaw is in vertical relation with the base, the said vertical step overlying said horizontally disposed base, actuation of said operating leg against the force of gravity, lifting said gate, said counterweighted body under the influence of gravity pivoting said gate around said shaft to tilt said vertical step and pivot said arcuate surface lower than said horizontal surface as said horizontal surface moves away from said horizontally disposed base.

3. A tenter clip comprising a horizontally disposed base provided with a raised clamping area, a vertical wall formed in said horizontally disposed base at one edge of said raised clamping area, a vertically upstanding bracket integrally formed in said horizontally disposed base, a movable jaw pivotally connected to said vertical upstanding bracket, a gate comprising a body having oppositely aligned bearings and a shoe face pivoted for independent movement upon said movable jaw, said shoe face having a film engaging face horizontally disposed in relation to said horizontally disposed base and engaging said raised clamping area when said movable jaw and said gate are in vertical relation with the base, said shoe face having a vertical step vertically aligned with said vertical wall when said movable jaw and said gate are in vertical relation with the base, a horizontal surface terminating on one end at said vertical step, a rearward arcuate surface terminating the other end of said horizontal surface, said gate being counterweighted to cause said arcuate surface to hang lower than said film engaging face upon movement of said movable jaw toward film engaging position whereby continued movement of said movable jaw will cause said vertical step to engage a bead on a film to pivot said gate into film gripping position.

4. A tenter clip comprising a body member having a fixed jaw provided with a clamping plate, a movable jaw pivotally connected to said body member, a leg integrally formed in said movable jaw, a gate comprising a body member having a rear surface and a bearing and counterweighted on the rear surface, a shoe face formed in the bottom of said gate consisting of a substantially horizontal surface, a vertical step and a second substantially horizontal surface extending rearwardly from said step and terminating in an arcuate surface formed as the base of said rear surface, a shaft, said shaft pivotally connecting said gate through said bearing to said movable jaw, the center of gravity of said gate being to the rear of the center of said shaft, said arcuate surface pivotally hanging lower than the forward end of said shoe face due to the counterweighting of said rear surface whereby said arcuate surface initially engages said clamping plate to cause said gate to rotate about the pivotal point of said shaft in a toggle movement initiated by said leg acting as a counterweight to cause said movable jaw to pivot toward a vertical position under the influence of gravity.

5. A tenter clip comprising a body member having a fixed jaw provided with a clamping plate, a movable jaw pivotally connected to said body member, a leg integrally formed in said movable jaw, a gate comprising a body member having a rear surface and a bearing and counterweighted on the rear surface, a shoe face formed in the bottom of said gate consisting of a substantially horizontal surface, a vertical step and a second substantially horizontal surface extending rearwardly from said step and terminating in an arcuate surface formed as the base of said rear surface, a shaft, said shaft pivotally connecting said gate through said bearing to said movable jaw, the center of gravity of said gate being to the rear of the center of said shaft, said arcuate surface pivotally hanging lower than the forward end of said shoe face due to the counterweighting of said rear surface whereby said arcuate surface initially engages said clamping plate to cause said gate to rotate about the pivotal point of said shaft in a toggle movement initiated by said leg acting as a counterweight to cause said movable jaw to pivot toward a vertical position under the influence of gravity, said first mentioned horizontal surface lying parallel to said clamping plate in film engaging position with a gap between said first mentioned horizontal surface and said clamping plate substantially equal to the thickness of a film to be held therebetween.

6. A tenter clip comprising a body member having a fixed jaw provided with a clamping plate, a movable jaw pivotally connected to said body member, a leg integrally formed to said movable jaw, a gate comprising a body member having a bearing, said body member being counterweighted in an area to the rear of a vertical line passing through the center of said bearing, a shoe face formed in the bottom of said gate, said shoe face having a substantially horizontal surface, a heel and a vertical step between said horizontal surface and said heel, said heel terminating an arcuate surface underlying said area to the rear of said vertical line, the radius generating the arcuate surface being struck from a vertical line located to the rear of said first mentioned vertical line, and on which lies the center of gravity of said gate, a shaft, said shaft pivotally connecting said gate through said bearing to said movable jaw to provide independent gravitational pivotal movement of said gate on said movable jaw with said heel hanging lower than the forward end of said shoe face, said leg acting as a counterweight to cause said movable jaw to pivot toward a vertical position, said arcuate surface engaging said clamping plate under the influence of gravity to cause said gate to rotate upon said shaft to rotate said shoe face into position with said vertical step in vertical position and with said horizontal surface lying parallel to said clamping plate in film engaging position with a gap between said horizontal surface and clamping plate substantially equal to the thickness of a film to be held therebetween and said vertical step being adaptable to engage a bead on the film.

References Cited in the file of this patent

UNITED STATES PATENTS

| 3,023,479 | Nash | Mar. 6, 1962 |
| 3,055,048 | Koppehele | Sept. 25, 1962 |

FOREIGN PATENTS

| 780,590 | Great Britain | Aug. 7, 1957 |